April 26, 1927.  J. LUND  1,626,292
PROCESS OF AND APPARATUS FOR MAKING OF FLUXING MATERIALS
Filed Oct. 23, 1920
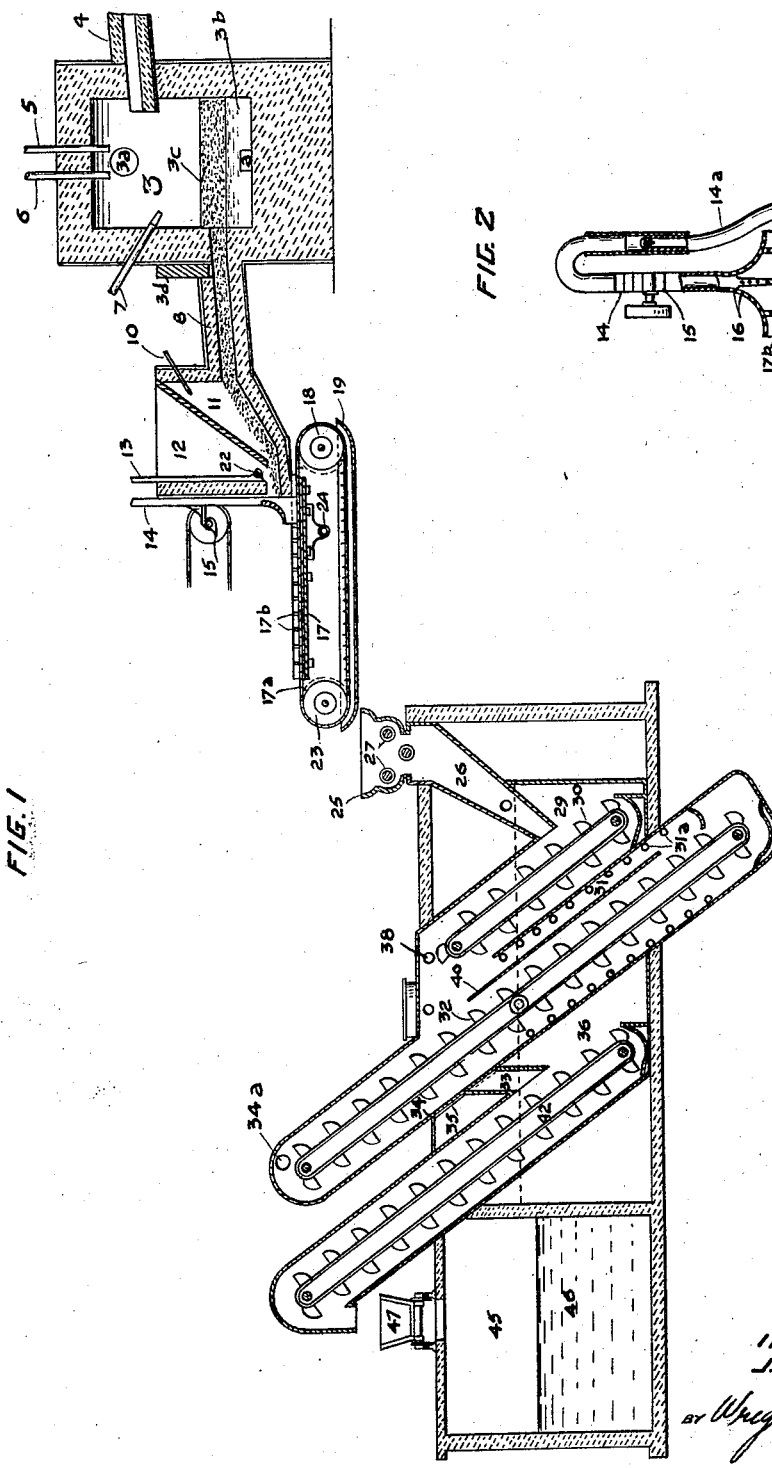
INVENTOR
J. LUND
by Wright & Chun
ATT'Y.

Patented Apr. 26, 1927.

1,626,292

UNITED STATES PATENT OFFICE.

JOEL LUND, OF SAN FRANCISCO, CALIFORNIA.

PROCESS OF AND APPARATUS FOR MAKING OF FLUXING MATERIALS.

Application filed October 23, 1920. Serial No. 418,947.

My invention relates to material for use in the smelting of metals and ores, and, more especially, those of iron, and when it is desirable to use fluid fuel in the reduction and smelting of ores and metals.

The objects are in general to provide a cheap and efficient fluxing, supporting and carburizing material of suitable chemical composition, and a method of preparing the same, for repeated use in metallurgical processes, especially where it is desirable to use fluid fuel in place of solid carbon.

The invention also contemplates the use of said material as a purified slagging element in processes where solid carbon is usual as fuel.

As the carrying out of my invention involves primarily the use of a molten siliceous substance such as blast furnace slag or the like, I can use for the production of this, as well as for the metallurgial process itself, any desirable form of furnace having preferably an upright shaft, and a closed top provided with means for charging material into the shaft, and provided also with suitable outlets for the gases and products of combustion. The lower part of the furnace is provided with suitable tuyères, connected with a source of supply of hot air and gas or gaseous hydrocarbons under pressure, and with means whereby the molten products coming from the zone of fusion can be conducted away as formed.

The furnace therefore in which the molten slag is produced is preferably the same as the one in which the regular smelting process is carried out with this difference in operation, to begin with, that I charge the furnace with ore, solid fuel and flux in the usual manner, smelt this down, and withdraw the contents in the usual way, until sufficient slag is accumulated to operate with according to my invention. There being a heated fore-hearth adjacent to the furnace proper, the molten metal, or a part of the same, is tapped into this, as is also the slag, which, resting on top of the metal, is blown with steam and air when necessary for the purification of the same.

As the slag, or as much of it as is needed, is used over and over again for fluxing and other purposes, this tends to an accumulation in the same of injurious elements, such as sulphur and phosphorus, unless means are provided whereby these may be eliminated from said slag.

My treatment is effective to this end, and the amount of steaming necessary will be determined by analyzing the metal and slag produced from certain materials of known composition. In cases where the materials entering the process are comparatively free from obnoxious elements or where the presence of such elements does no harm, I may omit the steaming of the slag altogether.

As the treated slag has to be puffed where it is to be used to hold up the charge in place of coke in the furnace, it is desirable not to use lime in excess in the charge of flux, as this weakens the structure of the puffed slag, but, when it is necessary for special reasons to use such lime, then it is preferable to puff the slag with air or steam and submit the puffed slag to the alkaline solution after the hydrocarbon has been coked in the same.

How this and the process as ordinarily carried out can be accomplished through the same mechanical means will be shown further on.

The slag produced being qualified through a process of purification and added material, either basic or acid, to act as a flux repeatedly in the process of smelting, I do not wish to limit myself to the use of lime only as a flux, though this is cheap, as fluorspar or chlorides and carbonates of other alkaline earths or alkali metals may be used to advantage, with or without lime.

My invention will be explained in detail, and further features thereof pointed out in connection with the accompanying drawings which illustrate an apparatus which may be used to advantage to practice said method.

In said drawing, Figure 1 is a vertical sectional view of the apparatus; Figure 2 is a front view of a water-cooled slag cutter which divides the slag as it flows out from a slag hopper.

A furnace chamber 3, preferably of the reverberatory type, is heated, through a burner 7 or in any other way, sufficiently to keep the slag $3^c$ in a hot molten condition, said slag resting on a molten metallic bath $3^b$ which may be tapped through an opening $a$. The slag runs into the furnace chamber 3 through a conduit 4, and comes from a blast furnace (not shown). Air and steam are blown in on top of the slag $3^c$ through pipes 5, 6, to purify the same, the gaseous products being withdrawn through a chimney 3ª. The purified slag flows through a conduit 8 into a slag-hopper 11, the quantity admitted being regulated by a gate 3ᵈ. The slag hopper is lined with refractory non-conducting material and is heated, if necessary, through a burner 10. A compartment 12 of said slag hopper contains granulated material or basic or acid nature to mix with the molten slag, as required, to help fit said slag for repeated use as a flux. The flow of said material into the slag is regulated by the speed of a feed screw 22, also by the opening or closing of a gate 13. As the molten slag runs out of the hopper 11 onto a metallic table 17, it is puffed by fluid under pressure that is supplied through a hollow member 21 and a supply pipe 24, the edges of said hollow member being fitted steam-tight against the under side of the table 17, a portion of which at this point is perforated, as shown at 20 so as to admit the passage of said fluid under pressure to be forced into the slag, thus puffing the same. As the molten slag runs out on the table 17, it is further moved by an endless metallic belt 17ª, having transverse metallic bars 17ᵇ and which runs on, and is moved by, drums 18—23, said belt being cooled by passing through a trough 19, filled preferably with a solution of a carbonate, which keeps the metal from corroding at the same time that the belt is being cooled. As it moves the slag is sub-divided by a cutter 14, which is hollow and contains an aqueous solution supplied through a pipe 14ª and which is forced through perforations 16 in main and branch knives constituting said cutter, thus keeping said knives cool and wet and adding moisture to puff the slag. The slag cutter is actuated vertically by a cam 15 which may be revolved by a differential speed mechanism in any well known manner. The amount of moisture or fluid necessary to cool and puff the slag sufficiently, so that the slag blocks, when cut out, may remain intact, is regulated by the pressure on the supply pipes, and also by valves $b$, $c$.

As the subdivided slag reaches the drum 23, it is delivered into a breaker 25, having rolls 27 so arranged as to merely separate such slag blocks as may still adhere together. From the breaker 25, this slag passes down a chute 26, which dips into a cistern 29, in which is contained an alkaline solution, through which the hot slag is carried by an elevator 30 and delivered into a compartment 31 for further treatment. The puffed slag is maintained as hot as practicable while passing through the solution in the compartment 29, in order that water taken up may be evaporated as quickly as possible before the slag is delivered into the compartment 31. It is seen that by this treatment, the solution is carried into the pores of the slag remaining there, while the water passes off as steam and is withdrawn through an opening 38. The compartment 31 into which the puffed slag is delivered is filled to a greater or less extent with petroleum heated by means of a steam coil 31ª, or, when the process is in operation for a time, by the heat still retained by the slag delivered thereto, and coming in contact with, said petroleum. A partition 40 sub-divides the compartment 31 into two parts, so that the slag sliding down said partition and being carried upward by an elevator 32 has twice the amount of contact with the oil which it would otherwise have. The descending portion of the elevator 32 carries the slag into a position to be delivered into compartment 36 through a chute 33, said compartment 36 being also filled with an alkaline solution, but not in communication with the solution in the compartments 31 and 29, so that the levels of the solutions therein may be kept at different heights if desired. The chutes 26 and 33 dip into said solutions, the gases forming in the several chambers of the compartment 31, being thereby prevented from escaping into the air, said gases being withdrawn through the openings 38 and 34ª and stored in a suitable gas-holder to be used for various purposes. The heated oil as it runs off the slag, sliding down the under side 34 of the compartment 31 is gathered in channels 35 in said under side 34 of said compartment which lead it back into the oil compartment 31, said channels passing on opposite sides of the opening 33 through which the slag falls into the compartment 36. The treated slag is now carried by an elevator 42 and delivered into a car 47 to be carried to a coke oven or other suitable vessel (not shown) where the volatile elements of the oil are expelled, or, what is the same thing, the petroleum is coked in the pores of the slag.

Should the slag or petroleum used contain much sulphur or other impurities it may be still further treated by being immersed in brine for a longer or shorter period. Compartment 45 containing said brine 46 is conveniently located for this purpose.

When it is desirable, as, for instance, when the slag is strong in lime, not to wet it much, compartments 29 and 36 may contain very little of the solution. The slag being carried into the oil compartment 31, the pores of the same being here filled with oil, said slag is then carried out to be coked, after which it may be used in the furance, sufficient basic or alkaline matter having been added in solid granular form through the hopper 12 and also to the charge in the furnace. The gases generated in the several chambers of compartment 31 being trapped by the solution are exhausted or withdrawn from said compartments by a suitable suction apparatus through openings 38 and 34ª.

By the above-mentioned process and apparatus there is obtained a porous silicious substance impregnated with basic or alkaline matter and carbon in intimate mixture, and this is used as a flux, a support for the ore or metal charge in the smelting furnaces, a purifying agent, and a carburizing agent, and it also renders the charge penetrable by gases. This material can be used in the place of the lime or coke when fluid fuel is used, and as it can be used repeatedly, it effects a great economy, especially where lime is not easily available. It is particularly advantageous when a fluid fuel is used, or where coke is scarce or high in price.

In the smelting of pig iron or scrap by means of hydrocarbons or fluid fuel, it is difficult to impart to, or even to retain in, the iron a desirable amount of carbon when said iron is fused. This is caused mainly by the oxidizing action in reference to iron when said fuels are used. If, however, a material such as herein described, containing, or forming or capable of forming a carbonate of the alkali-metals, be used to hold up the charge, said carbonates being non-volatile at the high temperature necessary to carry out the process, their joint action, together with the carbon and nitrogen involved, maintains a reducing atmosphere in the zone of fusion, or, what amounts to the same thing, the gases involved are maintained sufficiently carburizing in this zone, to impart to the iron the necessary carbon.

By the term re-agent in the claims is meant any substance which will re-act with the slagging agent which is being treated. In general, this will be of a basic character, such as lime, sodium or potassium carbonate, feldspar, fluorspar, and so on, but it may also be of an acid character, as when it is desired to treat ores for an excess of lime, or other bases therein.

When the hot puffed slag is passed through the chamber 29, said chamber containing only a small amount of the alkaline solution, or even none at all, said porous slag will retain sufficient heat to coke the hydrocarbons which are contained in its pores when moved in and through the chamber containing said hydrocarbons. In such case, it is not necessary to further heat said puffed slag in a separate coking chamber.

Whereas in certain of the claims I have used the expression "oil" it is to be understood that this expression is intended to include hydro-carbon which although solid at ordinary temperatures becomes liquid when sufficiently heated so as to be capable of being injected into the portions of the silicious substance.

By the term "charge" I mean the metalliferous material usually containing a gangue, a reducing agent and additional basic or acid material which, in conjunction with the herein mentioned flux, and said gangue produces a slag of proper constituency.

By the term "puffing agent" is meant any known material, generally of aqueous nature, which being forced into, through, or coming in contact with said molten silicious substance will cause the same to become porous.

I claim:—

1. The process which consists in heating in a blast furnace materials which will, when molten, produce a slag containing a carbonate of the alkali metals and molten iron, conducting molten iron and slag from said furnace into a heated chamber, forcing superheated steam and air onto said molten slag as it floats on said molten iron to purify the same and withdrawing said purified molten slag.

2. The method of preparing a fluxing material which consists in heating a metallic bath and molten slag floating on the same, applying superheated steam and air to said slag to purify the same, moving said purified molten slag in a stream and simultaneously forcing gaseous material from beneath the moving stream thru said molten slag to puff the same for the purpose described.

3. The process which consists in making porous a molten silicious substance, introducing liquid hydrocarbons into the pores of said substance and expelling the volatile elements of said hydrocarbons by means of heat.

4. The process which consists in making porous a molten silicious substance, introducing alkali matter in solution into the pores of said substance and evaporating the moisture from said matter.

5. The process which consists in withdrawing molten metal and slag from a furnace into a hot chamber, forcing hot oxidizing gases on to said slag in said chamber to purify the same, withdrawing the molten purified slag from said chamber, forcing fluids through said molten slag to make it porous when congealed, and introducing into the pores of said congealed porous slag material capable of re-acting therewith.

6. The method of preparing a flux which method includes the placing of a purified congealed slag in proximity to a charge in a smelting furnace, heating said charge and slag, withdrawing molten metal and slag from said furnace and conducting the same into a heated chamber, forcing superheated steam and air onto the molten slag floating on the molten metal in said chamber, simultaneously and separately withdrawing molten metal and slag and congealing said purified slag for the purpose specified.

7. The process which consists in conducting molten iron and slag from a blast furnace into a heated chamber, forcing superheated steam and air onto the molten slag floating on the molten iron in said chamber to purify the same, making said molten slag porous, introducing hydrocarbons into the pores of said porous slag and heating said slag in a coking chamber or the like to fix the carbon of said hydrocarbons in the pores of said slag.

8. The process which consists in smelting materials producing a slag containing a carbonate of the alkali metals and iron, conducting said slag into a heated chamber, forcing oxidizing fluids onto said slag as it floats on the molten iron in said chamber to purify the same, making said purified slag porous, introducing hydrocarbons in the pores of said porous slag and heating said slag in a coke oven to fix the carbon of said hydrocarbons in said pores.

9. The process of making a porous silicious substance containing in its pores solid carbonaceous material which consists in forcing a puffing agent into contact with said silicious substances when in a highly heated condition to render the same porous and then passing said heated porous substance through heated hydrocarbons.

10. The process of making a porous silicious substance containing in its pores solid carbonaceous material which consists in contacting said silicious substance when in a highly heated condition with a puffing agent to render said substance porous, passing said heated porous substance through heated hydrocarbons and expelling the volatiles of said hydrocarbons by means of heat in a coking chamber.

11. The process of preparing a silicious material for fluxing and other purposes which consists in forcing a puffing agent into said material when in a highly heated condition to form pores therein, passing said porous heated material through an alkaline solution and heated hydrocarbons and then heating said porous material in a coking chamber to expel the volatile constituents of said hydrocarbons.

12. An apparatus for forming a fluxing material comprising a receptacle for the fluxing material in a highly heated condition, a conduit leading therefrom, a perforated table to which said conduit leads, means for forcing a puffing agent through the perforations of the table and into the material, receptacles for an alkaline liquid, and oil and means for conducting the material through said receptacles in succession.

13. An apparatus for forming a fluxing material comprising a receptacle for the fluxing material in a highly heated condition, a conduit leading therefrom, a perforated table to which said conduit leads, means for forcing a puffing agent through the perforations of the table and into the material, means for cutting the material into pieces, means for separating the pieces of the material, receptacles for an alkaline liquid, and oil.

14. An apparatus for forming a fluxing material comprising a receptacle for the fluxing material in a highly heated condition, means for heating said receptacle, means to conduct molten metal and slag from a furnace into said receptacle, means for withdrawing metal and slag from said receptacle, a conduit leading therefrom, a perforated table to which said conduit leads, means for forcing a puffing agent through the perforations of the table and into the material, a receptacle for oil and means for conducting the material through said receptacle.

15. An apparatus for forming a fluxing material comprising a receptacle for the fluxing material in a highly heated condition, means for heating said receptacle, means in said receptacle to force steam and air on to said material, a perforated table, a conduit leading from said receptacle on to said table, means for regulating the flow of said material from said receptacle, means for adding material to said fluxing material as it flows, means for forcing a puffing agent through the perforations of the table and into the material, means for cutting the material into pieces, means for separating the pieces of the material, receptacles for an alkaline liquid and oil, means for conducting the material through said receptacles in succession and means for preventing the free escape of gases from said receptacles.

16. An apparatus for forming a fluxing material comprising a receptacle for the fluxing material in a highly heated condition, means for heating said receptacle, a conduit leading therefrom, a perforated table onto which said conduit leads, means for forcing a puffing agent through the perforations of the table and into the material, means for cutting the material into pieces, means for separating the pieces of the material, receptacles for an alkaline liquid and oil, means for conducting the material through said receptacles in succession and means for preventing the free escape of gases from said receptacle.

17. In an apparatus for the preparation of material for fluxing and other purposes, a receptacle for said material in a highly heated condition, a conduit leading into said receptacle from a smelting furnace, a conduit leading from said receptacle onto a perforated table, means for forcing a puffing agent through the perforations of said table and into contact with said material to make the same porous or puffed, means for moving said material over said table while being puffed, means for cutting said material into pieces while being moved and means for cooling said material moving and cutting means.

18. In an apparatus for the preparation of material for fluxing and other purposes in combination with a blast furnace, a conduit leading therefrom, a chamber into which said conduit leads, means for heating said chamber, means for forcing gaseous material onto molten slag floating on molten metal in said chamber and means for emptying said chamber.

19. An apparatus for forming a fluxing material comprising a receptacle for said fluxing material in a highly heated condition, means for heating said receptacle, means to conduct molten metal and slag from a furnace into said receptacle, means for withdrawing metal and slag from said receptacle, a conduit leading therefrom, a perforated table to which said conduit leads, means for forcing gas through the perforations of the table and into the material, means for cutting said material into pieces, a receptacle for the alkaline fluid and oil, means for moving the material into the receptacle, means for conducting the material through said receptacle and means for coking said material.

20. An apparatus for forming a fluxing material comprising a receptacle for said fluxing material in a highly heated condition, means for heating said receptacle, means to conduct molten metal and slag from a furnace into said receptacle, means for withdrawing metal and slag from said receptacle, a conduit leading therefrom, a perforated table to which said conduit leads, means for forcing gaseous material through the perforations of the table and into the material, means for cutting said material into pieces, a receptacle for the alkaline fluid and oil, means for moving the material into the receptacle, means for conducting the material through said receptacle, means for coking said material and means for cooling said cutting means.

JOEL LUND.